United States Patent [19]

Dick

[11] Patent Number: 4,881,862

[45] Date of Patent: Nov. 21, 1989

[54] SCREW SEAL

[75] Inventor: David S. Dick, San Luis Obispo, Calif.

[73] Assignee: Jenike & Johanson, Inc., No. Billerica, Mass.

[21] Appl. No.: 103,182

[22] Filed: Sep. 30, 1987

[51] Int. Cl.⁴ .............................................. B65G 53/48
[52] U.S. Cl. .................................... 414/218; 406/60; 100/145; 241/246; 414/213; 414/326; 222/413; 222/189; 222/195; 198/669; 198/670; 198/671
[58] Field of Search .................... 198/670, 671, 669; 222/152, 189, 413, 195; 241/246; 406/60; 414/218, 213, 326

[56] References Cited

U.S. PATENT DOCUMENTS

| 647,354 | 4/1900 | Anderson . | |
|---|---|---|---|
| 1,553,539 | 9/1925 | Kinyon . | |
| 1,737,090 | 11/1929 | Meyers . | |
| 1,746,041 | 2/1930 | Kinyon . | |
| 1,941,572 | 1/1934 | Morrow . | |
| 1,941,573 | 1/1934 | Morrow . | |
| 2,102,330 | 12/1937 | Newcomer . | |
| 2,184,248 | 12/1939 | Bonotto | 414/218 X |
| 2,299,470 | 10/1942 | Davis . | |
| 2,355,774 | 8/1944 | Baker . | |
| 2,404,884 | 7/1946 | Pieper . | |
| 2,428,995 | 10/1947 | Rogers . | |
| 2,556,392 | 6/1951 | Hawk . | |
| 2,732,086 | 1/1956 | Schnyder . | |
| 2,831,587 | 4/1958 | Rearick . | |
| 2,868,591 | 1/1959 | Van Herpt . | |
| 2,884,145 | 4/1959 | Müller et al. . | |
| 3,099,496 | 7/1963 | Kayser . | |
| 3,104,020 | 9/1963 | Klapp | 414/218 X |
| 3,106,428 | 10/1963 | Lenhart . | |
| 3,111,082 | 11/1963 | Larsson et al. . | |
| 3,232,419 | 2/1966 | Rasmussen . | |
| 3,314,733 | 4/1967 | Page . | |
| 3,333,679 | 8/1967 | Zimmermann et al. . | |
| 3,460,869 | 8/1969 | Herr . | |
| 3,580,419 | 5/1971 | Carter | 222/189 |
| 3,588,180 | 6/1971 | Herr . | |
| 3,602,552 | 8/1971 | Morgan . | |
| 3,683,796 | 8/1972 | Miner et al. | 100/145 |
| 3,693,842 | 9/1972 | Cozzarin et al. | 222/195 |
| 3,704,917 | 12/1972 | Boyhont et al. . | |
| 3,756,434 | 9/1973 | Teske | 414/218 |
| 3,841,465 | 10/1974 | Miller, Jr. et al. | 241/246 X |
| 4,109,966 | 8/1978 | Boyhont et al. | 198/669 X |
| 4,255,161 | 3/1981 | Grimminger et al. | 414/218 X |
| 4,274,786 | 6/1981 | Svensson et al. | 414/218 |
| 4,279,556 | 7/1981 | Ronning | 414/218 |
| 4,391,561 | 7/1983 | Smith et al. | 414/218 |
| 4,466,809 | 8/1984 | Kissel et al. | 414/218 X |
| 4,473,327 | 9/1984 | Delfs | 406/60 |
| 4,474,524 | 10/1984 | Kawakami et al. | 414/213 |
| 4,525,106 | 6/1985 | DiBuo et al. | 406/60 |
| 4,615,647 | 10/1986 | Lukacz | 406/60 |

FOREIGN PATENT DOCUMENTS

| 551228 | 5/1977 | U.S.S.R. | 406/60 |
|---|---|---|---|
| 772949 | 10/1980 | U.S.S.R. | 222/413 |

*Primary Examiner*—Frank E. Werner
*Attorney, Agent, or Firm*—Lahive & Cockfield

[57] ABSTRACT

A screw seal for conveying bulk particulate solids between spaces at differing gas pressures with minimal leakage of gas. A tubular housing encloses a screw conveyor section and a sealing section receiving the solids and forming a sealing plug. The sealing section has a divergent configuration that functions in combination with friction to create sufficient solids pressure with minimal driving torque and wear on the screw conveyor.

15 Claims, 2 Drawing Sheets

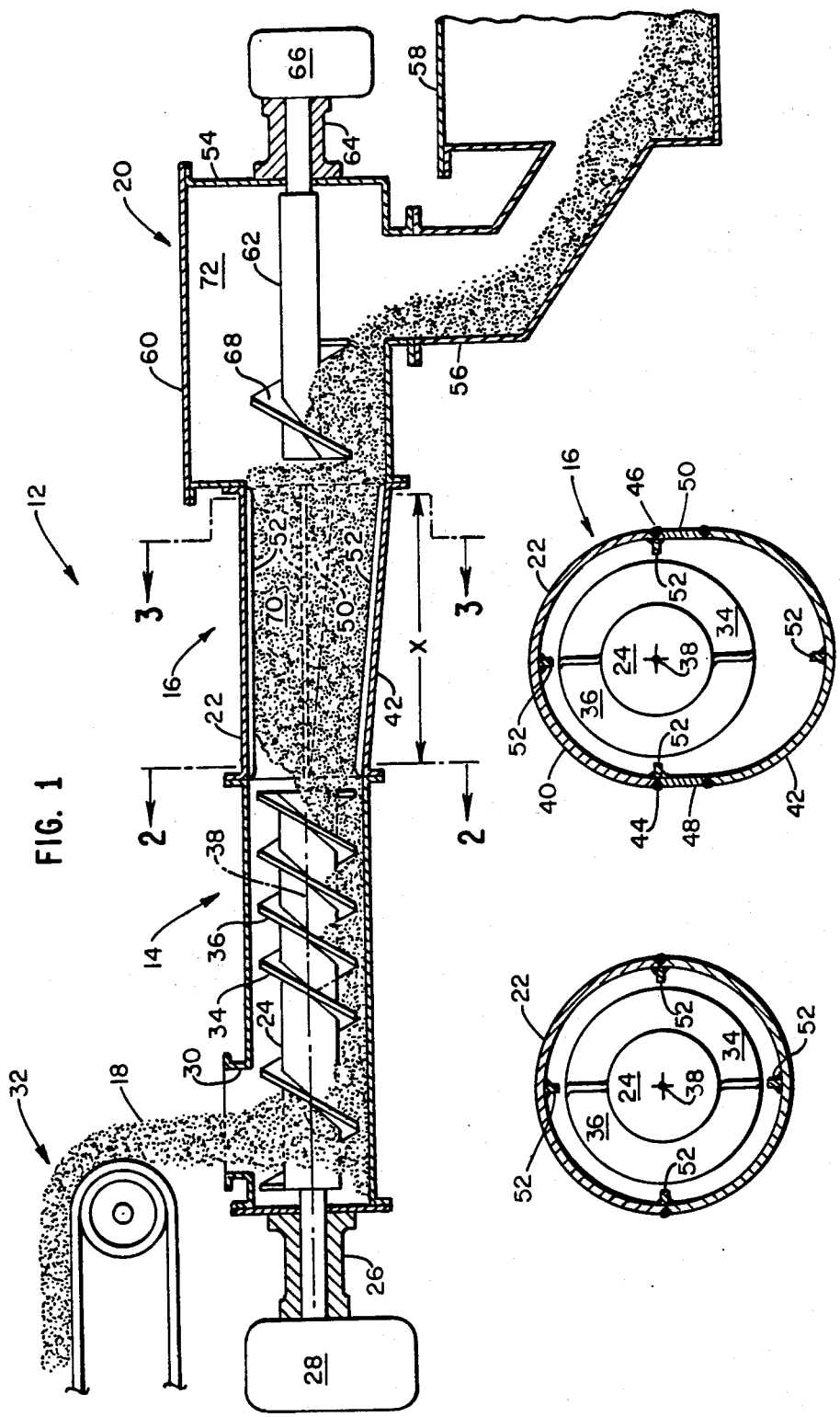

SCREW SEAL

SUMMARY

This invention relates generally to conveyors for bulk solids, that is, solids in particulate form, including coal, limestone, wood chips, municipal solid waste and other materials in powder, granular or other particulate forms. More particularly, it concerns conveyors for the transfer of such solids (hereinafter referred to as "solids" or "bulk solids") between spaces at differing gas pressures. The receiving space may be at the higher pressure, in which case it is desired to minimize countercurrent flow of the gas through the conveyed bulk solids, or at a lower pressure, in which case it is desired to minimize co-current flow of the gas through the bulk solids.

Typical applications occur in the mining and processing industries. Four commonly used methods of achieving gas pressure seals while feeding bulk solids are standpipes, lockhoppers, rotary valves and screw seals.

Standpipes operate on a simple principle but have the disadvantage of requiring relatively large headroom. Lockhoppers, which also require headroom, are normally relatively expensive because of the cost of a pressure vessel and associated valves. Rotary valves do not require much headroom, but the edges of the vanes tend to wear rapidly, thereby losing the ability to seal gas pressure differentials. Also, rotary valves are not suitable for sticky materials because the pockets tend to pack with solids.

Screw seals have been employed for the indicated purpose, and have the advantage of requiring only a low headroom. Hitherto, the screw seals either have a convergence, that is, a reduction in the cross section of the confining barrel, or a weir at the discharge end of the conveyor or at one or more locations along the screw shaft where the screw flights are discontinued. These configurations result in the development of a sealing plug of solids but at the expense of extremely high torque requirements for the screw feeder in many applications. As a result, a typical screw seal can operate with tolerable torque requirements for only a limited range of bulk solid flow properties and gas pressures over which the seals can be made effective.

An object of this invention is to provide a screw seal that may be employed for a substantially wider range of bulk solid flow properties and gas pressures.

Related objects are to minimize wear on the conveyor screw flights, bearings and other parts, which has typically resulted from the excessive torque requirements of the mechanism.

With the foregoing and other objects hereinafter appearing in view, the features of this invention include the provision of a conveying section feeding into a sealing section within a housing, wherein the sealing section has a divergent cross sectional area. The divergence is predetermined in conjunction with the compressibility and permeability of the bulk solids and the coefficient of friction between the solids and the barrel of the sealing section, so as to permit the formation of a sufficiently dense plug of the solids to form an effective gas seal, but to limit the solids pressures and thereby to control the resulting increase in driving torque.

Other features comprise a number of variations in the structures of the conveying and sealing sections, and also the discharge chamber into which the sealing plug is driven. These permit a large variety of applications and with many different types of bulk solid materials.

DESCRIPTION OF THE DRAWINGS

FIG. 1 is a longitudinal elevation in section of an embodiment of the invention.

FIG. 2 is a transverse elevation in section on line 2—2 of FIG. 1.

FIG. 3 is a transverse elevation in section on line 3—3 of FIG. 1.

DETAILED DESCRIPTION

Figure 4:
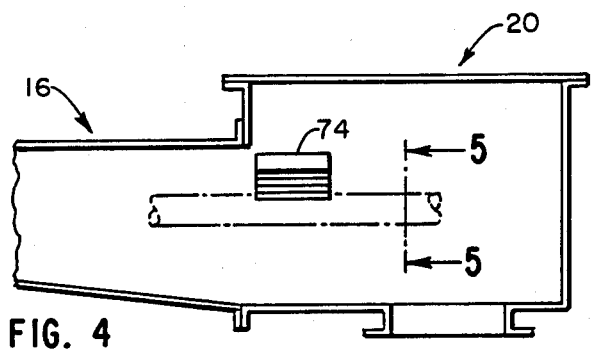
FIG. 4 is a fragmentary longitudinal elevation illustrating a plug break-up means.

Referring to FIGS. 1 to 3, a screw seal according to this invention is shown generally at 12. It comprises a conveying section 14 and a sealing section 16, the latter receiving bulk solids 18 from the conveying section and delivering them to a discharge chamber 20. A housing or barrel 22 encloses a shaft 24 supported by a bearing 26 and extending through the length of the conveying section 14, the shaft having a conventional drive 28. In the conveying section the housing 22 is fabricated of one or more parts preferably forming a cylindrical screw enclosure with an open ended transverse inlet extension 30 to receive the solids from an upstream conveyor or feeder such as a belt conveyor 32. The shaft 24 has a screw flight 34 extending from end to end, and in some cases a second or third screw flight such as 36 extending from the end contiguous to the sealing section a short distance toward the inlet 30.

The sealing section 16 has a diverging configuration. As shown, the cross section is of constant area above the axis 38 of the shaft 24, and the area below the axis 38 increases in the direction toward the discharge chamber. The portion of the housing 22 enclosing the sealing section is conveniently fabricated from a cylindrical tube that has been formed into half cylinders 40 and 42 by cutting them apart along diametrically opposed longitudinal lines 44 and 46. The half cylinders are then separated and joined, by welding or otherwise, to triangular pieces 48 and 50. The pieces 48 and 50 have their apexes at the location where the conveying and sealing sections are joined.

A plurality of inwardly projecting ribs 52 may be provided. Preferably, these ribs extend longitudinally of the housing 22 from one end to the other of the sealing section 16. Preferably, the height of these ribs is less than the clearance between the screw flights 34 and 36 and the barrel or housing 22. Their purpose is to prevent rotation of the solids within the sealing section, which would manifest itself as an inefficiency in the screw.

The discharge chamber 20 may comprise an enclosure 54 adapted to communicate by means of a chute 56 with a pressurized process chamber 58. The pressure is contained by an inspection hatch cover 60. A shaft 62 having a bearing 64 and drive 66 extends coaxially with the shaft 24 and bears a relatively short collecting screw 68. This screw may be run at a different speed than that of the feeding screw 34. Its purpose is to feed the material uniformly into the process chamber 58 without relying solely upon gravity, and in order to minimize potentially erratic forward movement of the material along the conveyor from affecting the instantaneous rate of feed of material to the process.

In some applications, the illustrated structure may be altered by having the shaft 24 extended the full distance between the bearings 26 and 64 with the shaft 62 extending as a sleeve over the shaft 24, with a separate drive. In other applications it may be acceptable to omit the collecting screw 68 and shaft 62. In the illustrated embodiment neither of these shafts extends into the sealing section 16.

In operation, the bulk solid material 18 falls from an upstream conveyor or feeder into the inlet 30 and the conveyor flight 34 carries the solids along toward the sealing section. The solids are ultimately picked up by the flights 36, if used, and the flights deliver them to the inlet end of the sealing section. The use of multiple flights, which may be more than two if desired, facilitates the delivery of a relatively uniform distribution of solids pressure to the sealing section.

By reason of the coefficient of friction between the solids and the barrel or housing 22, a sealing plug 70 is formed by compression of the material, and the plug advances rectilinearly toward the discharge chamber 20. It has been found that the pressure of the solids in the plug 70 is a function of this coefficient of friction, the bulk density of the solids, the length "x" and diameter of the plug, and the ratio "K" of the lateral to axial forces in the barrel 22. Of these parameters, all but "K" are controllable, measurable and essentially constant. However, the value of "K" is subject to change by as much as an order of magnitude depending upon conditions within the barrel 22. For example, in screw seals wherein the barrel 22 converges within the sealing section the solid pressures build up very rapidly, with the result that the drive 28 must exert extreme force to move the plug 70, with consequent wear upon the screw flights, bearings and other parts.

It has been found that the value of "K" can be controlled to achieve the necessary solid pressure for an effective seal with a relatively slower buildup of pressure so that excessive torque is not required. In general, this is achieved by the divergence of the barrel 22 in the sealing section, and the rate of divergence should be such that it is capable of producing an acceptable seal with minimum solids pressures.

Other factors also enter into the determination as to a proper rate of divergence within the sealing section. For example, as the screw conveyor rotates, the ends of the flights will apply a pressure to the plug 70 over relatively small segments of the cross sectional area of the barrel, causing the material in front of these contact areas to move forward with adjacent portions of the plug tending to remain stationary. This can result in a localized convergence of the material in excess of that required for a satisfactory seal. This may require a corresponding increase in the divergence of the barrel in some cases.

The conveying section 14 of the screw moves the material 18 along the bottom of the barrel. This, together with the localized contact area of the flight as discussed above makes the area at the bottom of the barrel most susceptible to high solids pressures due to localized convergence. In addition, the material in this area is confined by the weight of the solids on the sides of the plug. For this reason, in many cases it is desirable to provide for a relatively greater increase in the cross sectional area of the sealing section below the axis 38 than above this axis.

Possible changes in the flow properties should also be considered in the design of the screw seal. The actual movement of the sealing plug can be complicated by small changes in friction or cohesive properties of the solid, which can affect the operation of the seal. In any case, the sealing section diverges to ensure a net increase of area through which the plug 70 travels.

The apparatus of FIGS. 1 to 3 can be employed either for counter-current flow in which the gas pressure in the space 72 is higher than that at the inlet 30, or co-current flow in which the pressure in the space 72 is lower than that at the inlet 30. For counter-current flow, the screw seal design preferably includes the following steps. First, the bulk density of the bulk solids material is measured as a function of the consolidating pressure and the "spring back," that is, the elasticity, of the material is noted. Next, the permeability of the bulk solids is measured as a function of its bulk density. Next, the forward velocity of the plug 70 is calculated for the lowest bulk solids flow rate at which a seal is desired. Next, the permeability of the solid (and therefore the bulk density) is found, at which the superficial gas velocity through the plug of solids matches the velocity of the solids in the plug. This permits finding the consolidating pressure required to achieve the desired permeability. Finally, the length of the plug "x" required to achieve the desired consolidating pressure is found. This should be checked for various values of "K."

For co-current flow the procedure for designing a screw seal preferably includes the following steps. First, bulk density and permeability values are measured as described above. Next, the angle of repose of the material is found as a function of the superficial gas flow through the solid, Next, for the highest bulk solids flow rate required, the maximum acceptable gas leakage rate through the plug is established. Next, the permeability of the solid (and therefore the density) is found, at which the superficial gas velocity through a bed of the solid plus the velocity of the plug will result in the maximum acceptable leakage into the process. Finally, the consolidating pressure (and therefore the length of plug) required to achieve these conditions is found. It may be necessary in some cases to support the downstream exposed face of the plug if the angle of repose of the material under the design conditions is so low that the plug length to prevent loss of the seal becomes excessive.

Figure 5:
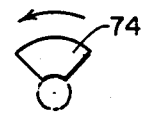
FIG. 5 is a transverse elevation on line 5—5 of FIG. 4.

FIGS. 4 to 11 illustrate certain structural variations of the screw seal according to this invention, for particular applications. FIGS. 4 and 5 illustrate one form of device for breaking up the plug 70 if sticky or cohesive solids material is to be handled. This comprises a projection 74 on the shaft 62 at a location near an end of the sealing section 16.

Figure 6:
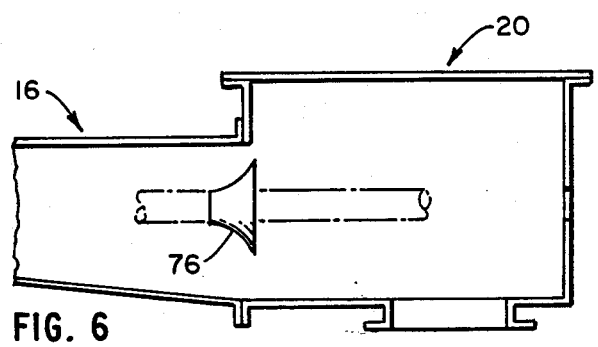
FIG. 6 is a fragmentary longitudinal elevation illustrating one form of means for creating localized convergence at the end of the sealing section.
Figure 7:
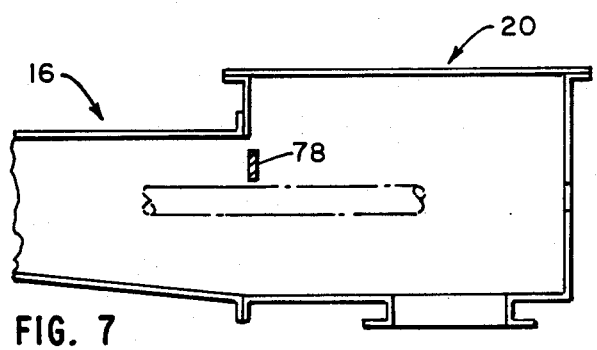
FIG. 7 is a fragmentary longitudinal elevation illustrating a weir for obtaining localized convergence.

FIGS. 6 to 9 illustrate means for causing localized convergence at the end of the sealing section. Such means help to establish and maintain a gas pressure sealing plug in free flowing materials. In FIG. 6 the convergence is caused by a uniform annular expansion of the shaft 62 formed by a sleeve 76 of roughly truncated conical form. In FIG. 7 a weir 78 is extended horizontally across the end of the sealing section for a similar purpose.

Figure 8:
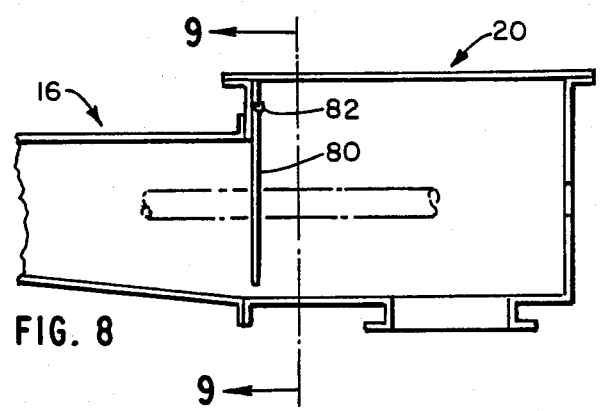
FIG. 8 is a fragmentary longitudinal elevation illustrating the use of a hinged flap at one end of the sealing section.
Figure 9:
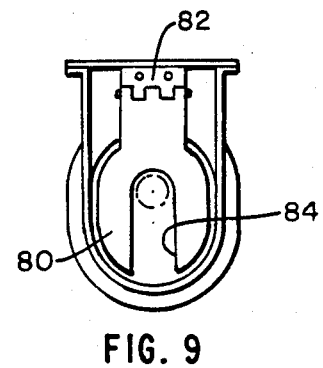
FIG. 9 is a transverse elevation on line 9—9 of FIG. 8.

FIGS. 8 and 9 illustrate a flap 80 hinged at 82 and closing an end of the sealing section. A slot 84 is formed in the flap to fit freely over the shaft 62. Suitable weights or a spring (not shown) may be attached to the flap to urge it toward the position illustrated in FIG. 8. The flap is also used to retain free flowing materials in the plug, and is especially useful when the equipment is used to hold a co-current pressure differential.

Figure 10:
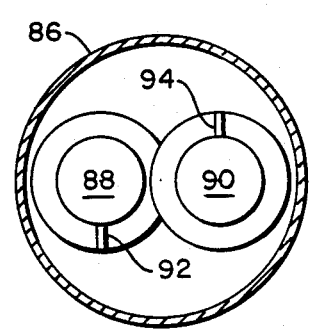
FIG. 10 is a transverse elevation in section illustrating an alternative form of the conveying section.

FIG. 10 illustrates a twin screw conveyor which may be substituted for the single conveyor screw of FIGS. 1 to 3. A housing 86 encloses shafts 88 and 90. The shaft 88 bears a screw flight 92, and likewise the shaft 90 bears a screw flight 94. The axes of the shafts are mutually parallel and the flights on the shafts extend transversely between one another in noninterfering relationship. The use of these twin interlocking screws permits the handling of sticky or cohesive bulk solids. The conveying section is connected with a sealing section preferably of the form described in connection with FIGS. 1 to 3.

By the use of this invention in one or another of the described forms, screw seals of a versatile, reliable and cost efficient form can be designed. Such screw seals avoid the danger of magnified solids pressures with consequent excessive wear of the parts.

I claim:

1. A screw seal comprising, in combination,
    a housing comprising an elongate tubular conveying section and an elongate tubular sealing section, one end of each section being joined to one end of the other, the conveying section having an inlet opening longitudinally spaced from its joined end for receiving a stream of bulk solids,
    a discharge chamber connected to the other end of the sealing section,
    feed screw means within the conveying section and extending between the inlet opening and said joined ends,
    means to rotate the feed screw means to cause flow of the solids to and through the sealing section to said chamber, said flow being variable between predetermined highest and lowest operating solids flow rates,
    means for producing and maintaining a gas pressure differential between said chamber and the inlet opening during said flow, the sealing section having a cross sectional area diverging toward said other end, said divergence being greater below than above a horizontal plane defined by diametrically opposed longitudinal lines in the sealing section, said divergence and the length of the sealing section being related so that during said flow the coefficient of friction between the solids and the wall of the sealing section causes compression of the solids, said compression forming a plug having a density limiting the flow of gas between the discharge chamber and the inlet opening to a predetermined maximum leakage rate during flow of the solids between said highest and lowest rates, and
    means to break up the plug as it is discharged into said chamber.

2. A screw seal according to claim 1, in which the feed screw means include a plurality of flights at the end of the conveying section contiguous to the sealing section.

3. A screw seal according to claim 1, in which the sealing section has at least one longitudinally extending internal rib.

4. A screw seal according to claim 1, including a discharge chamber having therein a rotatable shaft extending parallel to the feed screw means, the shaft having thereon a radially projecting breakup extension.

5. A screw seal according to claim 1, in which the sealing section has means causing localized convergence of the solids at the end thereof contiguous to the discharge chamber.

6. A screw seal according to claim 5, in which the means causing convergence comprise a weir extending transversely of the sealing section.

7. A screw seal according to claim 5, in which the means causing convergence comprise a shaft extending parallel to the feed screw means, a portion of the transverse cross sectional area of the shaft increasing toward said chamber.

8. A screw seal according to claim 1, including a discharge chamber having a flap pivotally mounted therein and means yieldingly urging the flap to extend transversely across the contiguous end of the sealing section.

9. A screw seal according to claim 1, including a discharge chamber having therein a rotatable shaft extending parallel to the feed screw means and having a collecting screw thereon.

10. A screw seal according to claim 9, including means to rotate the collecting screw at a different speed than that of the feed screw means.

11. A screw seal according to claim 1, in which the feed screw means comprise a pair of parallel shafts, each shaft having at least one flight thereon, the flights of the respective shafts extending transversely between one another.

12. A screw seal according to claim 1, in which the means to rotate the feed screw means comprise a shaft extending through the conveying and sealing sections.

13. A screw seal according to claim 1, in which the means to rotate the feed screw means comprise a shaft terminating within the conveying section.

14. A screw seal according to claim 1, wherein the gas pressure is higher in said chamber than in the inlet opening and said maximum leakage rate is predetermined for said lowest solids flow rate.

15. A screw seal according to claim 1, wherein the gas pressure is lower in said chamber than in the inlet opening and said maximum leakage rate is predetermined for said highest solids flow rate.

* * * * *